United States Patent Office
2,798,321
Patented July 9, 1957

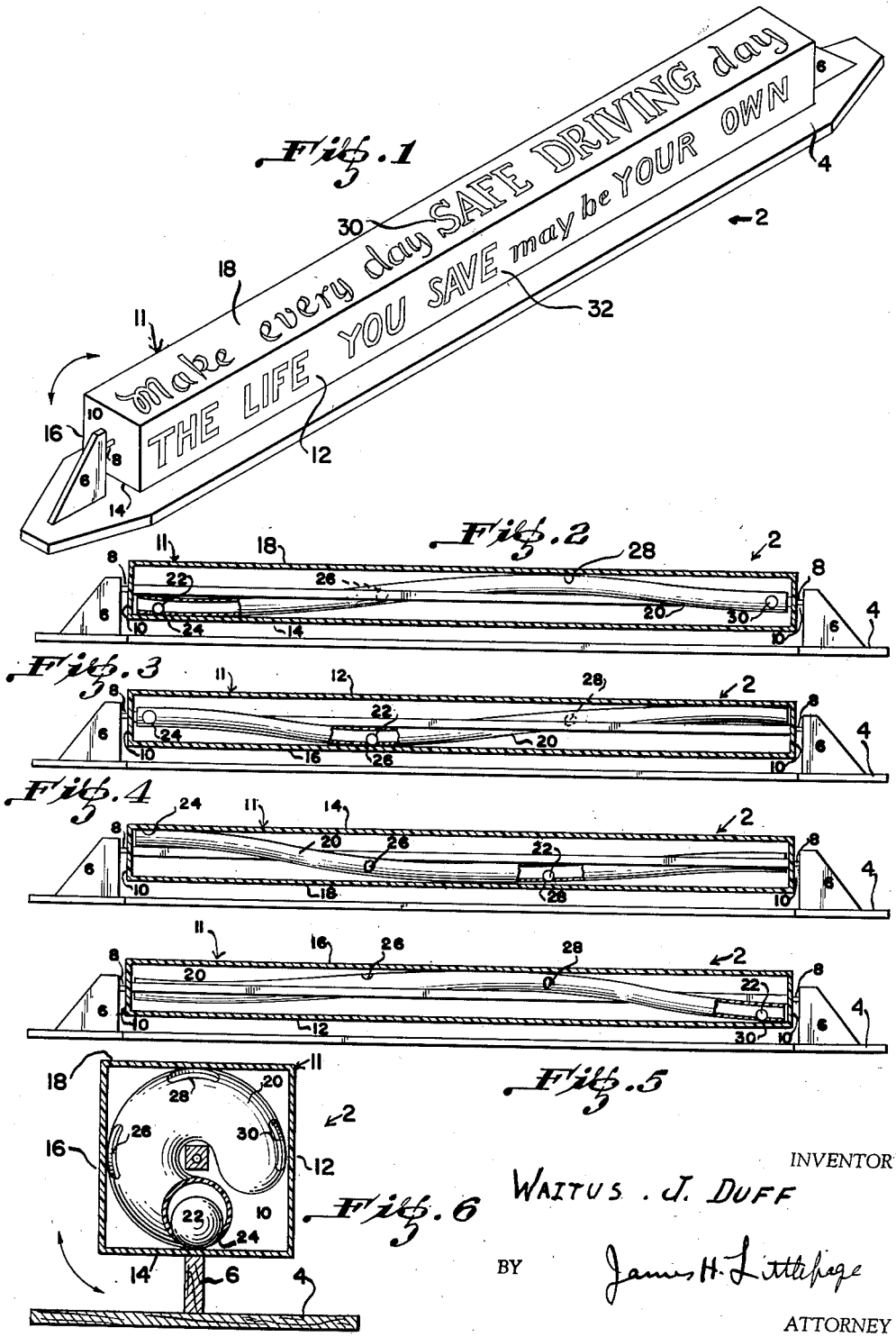

2,798,321

INERTIA-MOMENTUM OPERATED ROTATABLE SIGN

Waitus J. Duff, Kinston, N. C.

Application February 23, 1956, Serial No. 567,222

4 Claims. (Cl. 40—68)

This invention relates to changeable exhibitors and, more particularly, to an inertia-momentum operated rotatable sign adapted especially for use in vehicles.

The object of the invention is to provide a sign box adapted for mounting on or in a vehicle, wherein the motion of the vehicle causes the sign box to rotate and thus display various messages displayed on its sides. More particularly, it is intended to provide an elongate hollow box rotatably mounted on a support and having a plurality of flat exterior surfaces selectively exposed to view as the box rotates from one position to another. A helical tube extending lengthwise within the box contains a free ball weight which tends to stay at a bottom position within the tube. Thus, when the ball weight shifts within the tube, it exerts a camming action so that, as the vehicle suddenly moves, the box is rotated to dispose one or another of its sides to the viewer. A further object is to provide seats spaced along the length of the tube and disposed at angular positions respectively corresponding to the flat sides of the box, so that the ball weight will tend to rest in one of the seats and thus hold the corresponding box side in a vertical plane.

These and other objects will be apparent from the following sepcification and drawing, in which: Fig. 1 is a perspective view of the sign in one characteristic position; Figs. 2, 3, 4, and 5 are vertical cross-sections taken longitudinally of the sign, and illustrating the operation of the free ball weight; and, Fig. 6 is a vertical cross-section taken transversely through the sign.

Referring now to the drawing, in which like reference numerals denote similar elements, the sign indicated generally at 2 is supported on a base 4 which may be provided with conventional mounting means, not shown, so that it may be affixed either cross-wise or fore-and-aft on a vehicle. For purposes of present consideration, let it be assumed that base 4 rests on the shelf behind a rear seat of an automobile so that it will be visible to following vehicles through the rear window.

Near the ends of base 4 are a pair of upstanding brackets 6 which rotatably support pintles 8 extending outwardly from end walls 10 of an elongate box, denoted generally at 11, the box having, in the illustrated embodiment, four flat sides 12, 14, 16 and 18, respectively.

Mounted within box 11 is an elongate helical guideway, i. e., tube 20, whose helix extends for substantially 270° from end to end around the axis of rotation of box 11, as defined by pintles 8. A ball weight 22 is loosely supported within tube 20, and is free to run from end to end, except insofar as it may be restrained by engagement in seats 24, 26, 28 and 30, formed by holes drilled through the tube side wall at selected intervals. Thus, if ball 22 moves forcefully, as when the vehicle turns around a corner, it may roll past the intermediate seats 26 and 28 to the seat in that end of the tube 20 towards which it is directed. However, if the ball drifts lengthwise of tube 20 with less force, as when the vehicle passes another, ball 22 may lodge in the first seat to which it rolls. As will be apparent by comparing Figs. 2 to 6 with one another, the seats 24—30 are arranged at 90° intervals, and have predetermined relationships with box sides 12—18. Sides 12—18 are adapted to display different messages, such as slogans 30, 32.

In operation, it will be assumed that ball weight 20 rests in seat 24, whereupon box sides 12 and 16 are disposed vertically and, for purposes of illustration, it is further assumed that side 12 is disposed toward the rear of the vehicle. The gravitational forces exerted on ball 22 tend to maintain it in the lowermost possible position in the tube so that gradual starting or stopping motions of the vehicle produce only minor pendular motion of the box. When the vehicle turns to the left, the centrifugal forces exerted on ball 22 roll it off its seat 24 and along tube 20 until it comes to rest on one of seats 24, 26 or 28. Meanwhile, ball 22 tends to hang at the lowest possible position in tube 20, so that as the ball moves lengthwise, it rotates tube 20 by a camming action. Thus, box 11, in which tube 20 is fixed, is correspondingly rotated to present a new side to the rear and thus change the display.

It will be understood to those skilled in the art that box 11 may have various numbers of sides, and that the helical angle of tube 20 and the disposition of the ball seats may be varied to produce desired different effects. Additionally, restraint means other than the illustrated ball seats may be utilized, and the assembly may be disposed in a vehicle with its length either crosswise or fore-and-aft of the running directions, the invention being limited only by the scope of the following claims.

I claim:

1. An inertia-momentum moved exhibitor comprising a support adapted to be disposed on a vehicle, a member mounted on said support for rotation about an axis, said member having a plurality of outwardly disposed sides angularly disposed about said axis, said sides being adapted to display indicia, a helical guideway fixed in said member, said guideway having its helical length disposed around said axis, a substantially free weight in said guideway, whereby motion of said free weight lengthwise of said guideway in response to forces resulting from movement of said vehicle rotates said member about said axis, and a plurality of means positioned along the length of said guideway at predetermined intervals for restraining free movement of said weight.

2. The combination claimed in claim 1, the means for restraining said weight being disposed at angular intervals along the length of said helical guideway corresponding respectively to the angular dispositions of the sides of said member.

3. An inertia-momentum moved exhibitor comprising a support adapted to be disposed in a vehicle, an elongate hollow box mounted on said support for rotation about its longitudinal axis, said box having a plurality of generally flat outer sides adapted to display indicia, an elongate helical tube fixed in said box, said tube having its helical length disposed around said axis, and a ball weight in said tube, whereby motion of said ball weight lengthwise of said tube in response to forces resulting from movement of said vehicle rotate said box about its axis, said tube having ball seats formed therein at spaced intervals along the length thereof, said seats being angularly spaced from one another at intervals corresponding substantially to the angular spacing of the sides of the box.

4. An inertia-momentum moved exhibitor, comprising a support having a pair of brackets spaced thereon, an oblong box disposed lengthwise between said brackets, said box having end walls at each end thereof and four elongate side walls, pintles extending outwardly from said end walls and engaging in said brackets for rotatably supporting said box about an axis of rotation extending centrally through said box, a helical tube extending from end to end in said box and circumscribing an arc of substantially 270° about said axis, the inner wall of said tube having four ball seats in the outermost side thereof, said seats being disposed at 90° intervals and respectively corresponding in angular position to the angular disposition of the sides of said box, and a ball weight moveable endwise in said tube.

References Cited in the file of this patent

UNITED STATES PATENTS

| 1,006,480 | Huckle | Oct. 24, 1911 |
| 2,089,858 | Rodriguez | Aug. 10, 1937 |

FOREIGN PATENTS

| 17,713 | Great Britain | of 1910 |